United States Patent Office 3,338,856
Patented Aug. 29, 1967

3,338,856
COATING COMPOSITIONS CONTAINING CERTAIN ETHYLENE COPOLYMERS AND WAX MIXTURES
Karekin G. Arabian, Walnut Creek, and Robert G. Lutz, Berkeley, Calif., and George A. Martin, Houston, Tex., assignors to Shell Oil Company, New York, N.Y., a corporation of Delaware
No Drawing. Filed July 29, 1965, Ser. No. 475,892
11 Claims. (Cl. 260—28.5)

This application is a continuation-in-part of applicants' application Ser. No. 388,320, filed Aug. 7, 1964, and now abandoned.

This invention relates to wax-containing coating compositions and particularly to wax coating compositions containing polymeric materials, which compositions have superior physical properties as well as appearance.

Petroleum-derived waxes have been used for many years to coat paper and carton boards especially for use in wrapping and containing dairy products and other food products such as bakery goods as well as for coating cloth, fibers, and food products including cheese and meats to render them moisture-vapor resistant. Such waxes, however, have an unfortunate tendency to crack and peel off the coated articles, especially when they are subjected to repeated flexing or severe creasing. Even waxes modified with polyethylene, while having some improved properties, show disadvantages relative to brittleness and lack of tensile strength particularly under low-temperature conditions.

In the last few years, the disadvantages which are normally attendant to the use of wax in coating applications have resulted in the significant supplanting of wax alone by the use of polymeric coatings, polyethylene in particular. However, despite the wide use of polyethylene-coated paper for a wide variety of packaging uses, such laminates have not been a panacea since they too lack many important properties. For example, polyethylene coatings lack the desired resistance to penetration by oxygen, organic vapors and water vapors and, in addition, are very expensive. As a result, there has been considerable interest in the incorporation of polymeric materials into wax for the purpose of benefitting from the most desirable properties of both. Thus, polymers such as ethylene-propylene copolymer, ethylene-vinyl acetate copolymer, ethylene-ethyl acrylate copolymer, various synthetic rubbers and the like have all been proposed for incorporation into wax.

Though many such polymeric materials have been used for blending with wax, with widely varying degrees of success in an attempt to enhance tensile strength, elongation, sealing strength, grease resistance and, at higher concentrations, even water vapor permeability, the addition of copolymers to wax gives rise to some detrimental effects as well. The most serious of these is phase separation which occurs in both the liquid and solid phases of the mixture. Liquid-phase incompatibility is manifested by the appearance of two distinct phases during molten storage. On the other hand, solid-phase separation gives rise to a particular gloss instability, known as a "bloom," on the surface of the wax film.

It has now been found that the problem of poor gloss stability and other film degradation, including "blooming," can be reduced substantially by proper selection of a combination of certain distillate and residual waxes in selected ratios without degradation of the other properties.

More particularly, it has been found that gloss-stable wax compositions containing as much as 50% by weight copolymer are produced by selection, as the wax component, of a mixture of waxes consisting of (a) a distillate paraffinic wax having a melting point of at least 135° F. and which contains no more than about 30% by weight non-normal paraffins, and (b) a residual wax, the weight ratio of (a) and (b) each to the other being from 0.7:1 to 1.4:1. The foregoing composition when mixed with copolymer may be extended, without detriment to its properties, with up to 25% by weight and preferably with from 5 to 15% by weight of the total wax component of distillate paraffinic wax having a melting point of at least 150° F. and which contains at least about 40% by weight of non-normal paraffins. A still more preferred range for this higher melting distillate paraffinic wax is about 10–15% by weight.

The waxes which may be used in accordance with the invention, and which are preferred, are petroleum waxes derived from the refining of waxy lubricating oil base stocks. By the term "distillate wax" is meant those waxes which are derived from the refining of distillate lubricating oils, while the term "residual wax" refers to those waxes which are removed during refining of residual lubricating oils such as bright stock. The distillate waxes are generally paraffinic in nature, the ratio of normal-to-isoparaffins in which is inversely related to their molecular weight. The residual waxes, on the other hand, may contain microcrystalline wax or high-melting-point paraffins or both. Virtually all residual waxes are constituted of a mixture of both microcrystalline (amorphous) and paraffinic waxes; however such waxes can be further refined (split) to produce separate wax fractions which are essentially microcrystalline and essentially paraffinic (crystalline) in character. To be used in the coating compositions of the invention, the waxes must be rather highly refined, i.e., they should contain no more than about 2.0% by weight oil and preferably 1.0% by weight or less.

The polymers which can be used in accordance with the invention can be characterized in a general way as long-chain hydrocarbon backbones which are randomly and irregularly substituted with side chains which are no more than about three atoms in length. More specifically, the polymers are copolymers of ethylene with terminally ethylenically unsaturated organic compounds containing 3–5 carbon atoms. The preferred comonomers are selected from the group consisting of alpha-olefins, esters of terminally ethylenically-unsaturated monocarboxylic acids and saturated aliphatic alcohols and esters of saturated monocarboxylic acids and terminally ethylenically-unsaturated aliphatic alcohols. Examples of such comonomers are unsaturated esters such as vinyl acetate, ethyl acrylate and methyl acrylate and normal lower alpha-olefins such as propylene, butene-1 and pentene-1.

The ethylene-vinyl acetate copolymers which are to be used in the compositions of the invention correspond to the general formula

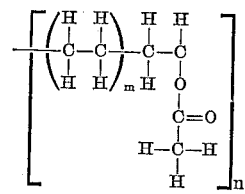

wherein n ranges from about 15 to about 250. The actual occurrence of the acetate substituents along the hydrocarbon chain is of a random character and thus the letter "m" denotes the average number of ethylene units per vinyl acetate unit in the molecule rather than the presence of regularly recurrent units having the composition given within the above brackets. The value for "m" ranges from about 6.5 to 30 and preferably from about 8 to 14. Typical properties of ethylene-vinyl acetate copolymer which may be used in the invention are as follows:

gained by the combination of several different degrees of high and low density and/or high and low molecular weight insofar as increase in low-temperature properties without a corresponding increase in brittleness being experienced.

The mole ratio of ethylene to higher alkene in the copolymer can be varied from as low as about 60% to as high as about 95% (molar basis). However, more highly crystalline copolymers, i.e., those having from 80 to 95%

TABLE I.—PROPERTIES OF ETHYLENE—VINYL ACETATE COPOLYMERS

|  | A | B | C | D | E | F | G | H | I | J |
|---|---|---|---|---|---|---|---|---|---|---|
| Wt. Percent Vinyl Acetate | 33 | 27–29 | 28 | 28 | 28 | 28 | 23 | 23 | 18 | 18 |
| $C_2$/Vinyl Acetate Mole Ratio | 6.5/1 | | 8/1 | 8/1 | 8/1 | 8/1 | 10/1 | 10/1 | 14/1 | 14/1 |
| Melt Index, g./10 min | 25 | 125–175 | 100 | 15 | 25 | 15 | 400 | 100 | 2 | 150 |
| Molecular Weight | 28,000 | | | | 28,000 | 33,000 | | | | |
| Softening Point (R and B), °F | 243 | 192 | | 252 | 255 | 276 | | | | |
| Tensile Strength, p.s.i | 1,000 | 460 | | 1,700 | 1,000 | 2,000 | | | | |
| Elongation at Break, Percent | 700 | 650 | | 800 | 700 | 750 | | | | |
| Density | 0.95 | 0.95 | | | 0.95 | 0.95 | | | | |

The ethylene-alpha-olefin copolymers which may also be used in accordance with the invention have the general linear configuration

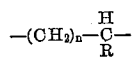

wherein $n$ is an average integer between about 10 and about 50 (preferably 10–40), R is a hydrocarbyl radical having 1–3 carbon atoms and the unit $(CH_2)_n$ is an unbranched hydrocarbon chain, the average molecular weight of the copolymers being between about 20,000 and 800,000 (preferably 200,000–400,000). Expressed as intrinsic viscosity (expressed as deciliters/gm.), copolymers having intrinsic viscosities of between about 1.0 and 3.0 are preferred. Intrinsic viscosity is determined in decalin at 150° C.

The density of the copolymers may be varied over a considerable range, usually between about 0.85 to about 1.0, low density copolymers being regarded as those having densities in the order of 0.85 to about 0.91 and high density materials being regarded as those having densities from the latter upper limit to about 1.0. Advantages are ethylene are preferred in order to avoid excessive tackiness.

Typical properties of ethylene-propylene copolymer as well as some other unsaturated ester copolymers are as follows:

TABLE II.—PROPERTIES OF OTHER ETHYLENE COPOLYMERS

|  | Ethylene/ethyl acrylate copolymers | | Ethylene/methyl acrylate copolymers | | Ethylene/ propylene copolymer |
|---|---|---|---|---|---|
| Sample | K | L | M | N | O |
| Wt. Percent Comonomer | 20 | 30 | 17.4 | 23.6 | 18 |
| Melt Index, g./10 min | 18 | 18 | 3.5 | 6.6 | [1] 15 |
| Molecular Weight | 32,000 | | 41,000 | 38,000 | 200,000 |
| Tensile Strength, p.s.i | 1,200 | 750 | 1,180 | 1,200 | 3,500 |
| Elongation at Break, Percent | 700 | 800 | 710 | 763 | 570 |
| Density | 0.927 | 0.932 | 0.942 | 0.947 | |

[1] Measured in 30% concentration with 180° F. residual paraffinic wax.

The amount of polymer in the wax mixtures must be at least 5% but should not exceed about 50% by weight of the total composition, and preferably no more than about 35%.

The problem of "blooming" and the difficulty of solving this problem without detriment to other important properties of the coating composition is best seen by reference to the examples which follow:

EXAMPLE I

A large number of blends of ethylene-vinyl acetate copolymers with individual wax fractions was prepared in order to determine the effects of relative polymer concentration and type of wax on the properties of the coating produced therefrom. The results are given in the following table.

TABLE III.—PROPERTIES OF WAX-COPOLYMER BLENDS

| Blend No. | Copolymer Percent wt. | Type [1] | Wax Percent wt. | Description | Brookfield viscosity (cp.) 210° F. | 240° F. | Sealing strength [4] (g./in.) 75° F. | 85° F. | Water vapor permeability (g./100 in.²/24 hrs.) Flat [2] | Creased [2] | Liquid compatibility temperature,[3] ° F. | Gloss characteristics |
|---|---|---|---|---|---|---|---|---|---|---|---|---|
| 1 | 0 | | 100 | 124–126° F. M.P., paraffinic. | | | | | | | | Gloss-stable. All polymer blends bloomed within 30 seconds at 73° F. |
| 2 | 2 | F | 98 | | | | 130/0 | 191/0 | 2.2 | 5.9 | | |
| 3 | 5 | | 95 | | 12.2 | 9.8 | 130/64 | 176/0 | 3.2 | 7.0 | <150 | |
| 4 | 10 | | 90 | | 46.4 | 32.7 | 137/82 | 193/86 | 3.9 | 5.7 | | |
| 5 | 20 | | 80 | | 568 | 434 | 170/129 | 240/122 | 3.6 | 7.5 | | |
| 6 | 30 | | 70 | | 3,950 | 2,470 | [4] CFT | CFT | 1.0 | 3.0 | | |
| | | | | | | | CFT | CFT | 0.8 | 0.9 | | |
| 7 | 2 | A | 98 | 124–126° F. M.P., paraffinic. | | | | | | | 150–175 | All polymer blends bloomed within 30 seconds at 73° F. |
| 8 | 5 | | 95 | | | 3.8 | | | | | | |
| 9 | 10 | | 90 | | | 25.0 | | | | | | |
| 10 | 20 | | 80 | | | 233 | | | | | | |
| 11 | 30 | | 70 | | | 1,363 | | | | | | |
| 12 | 0 | | 100 | 141–143° F. M.P., paraffinic. | | | 108/64 | 151/74 | 0.1 | 4.4 | | Gloss-stable. All polymer blends bloomed within 30 seconds at 73° F. |
| 13 | 2 | F | 98 | | | | 83/57 | 105/73 | 0.7 | 4.5 | 150–175 | |
| 14 | 5 | | 95 | | 15.9 | 12.1 | 97/79 | 116/95 | 0.6 | 5.2 | | |
| 15 | 10 | | 90 | | 61.3 | 41.9 | 269/181 | 294/181 | 0.4 | 5.2 | | |
| 16 | 20 | | 80 | | 735 | 584 | CFT | CFT | 0.2 | 2.8 | | |
| 17 | 30 | | 70 | | 5,850 | 2,940 | CFT | CFT | 0.9 | 2.6 | | |
| 18 | 30 | | 70 | | 3,175 | 1,875 | | | | | | |
| 19 | 30 | | 70 | | 4,000 | 2,300 | | | | | | |
| 20 | 50 | | 50 | | | [4] 36,000 | | | | | | |
| 21 | 55 | | 45 | | | [4] 55,000 | | | | | | |
| 22 | 60 | | 40 | | | [4] 63,000 | | | | | | |
| 23 | 0 | | 100 | 141–143° F. M.P., paraffinic. | | | 60/41 | 71/46 | 0.4 | [5] 4.8 | | Gloss-stable. All polymer blends bloomed within 30 seconds at 73° F. |
| 24 | 2 | E | 98 | | | 6 | 114/75 | 147/75 | 0.4 | 4.3 | | |
| 25 | 5 | | 95 | | | 12 | 161/124 | 167/135 | 0.6 | 4.7 | | |
| 26 | 2 | E | 98 | 141–143° F. M.P., paraffinic. | | 6 | 113/73 | 138/92 | 0.7 | 4.4 | | All polymer blends bloomed within 30 seconds at 73° F. |
| 27 | 5 | | 95 | | | 12 | 168/127 | 188/137 | 1.5 | 5.1 | | |
| 28 | 10 | | 90 | | | 42 | [4] CFT | CFT | 1.3 | 6.3 | | |
| 29 | 20 | | 80 | | | 315 | CFT | CFT | 0.1 | 4.3 | | |
| 30 | 30 | | 70 | | 4,000 | 1,928 | CFT | CFT | 0.1 | 1.0 | | |
| 31 | 30 | | 70 | | 3,150 | 1,853 | | | | | | |
| 32 | 0 | | 100 | 158–162° F. M.P., paraffinic. | | | 141/0 | 160/0 | 0.2 | 5.1 | | Gloss-stable. All polymer blends were gloss-stable at 73° F, bloomed at about 93° F. |
| 33 | 2 | F | 98 | | | | 266/93 | 268/134 | 1.1 | 4.5 | 200–225 | |
| 34 | 5 | | 95 | | 21.2 | 17.0 | CFT | CFT | 0.9 | 7.8 | 200–225 | |
| 35 | 10 | | 90 | | 82.9 | 60.4 | CFT | CFT | 1.4 | 9.2 | 200–225 | |
| 36 | 20 | | 80 | | 1,060 | 633 | CFT | CFT | 0.5 | 2.5 | <175 | |
| 37 | 30 | | 70 | | 7,460 | 4,090 | CFT | CFT | 0.7 | 1.1 | <175 | |
| 38 | 5 | A | 95 | 158–162° F. M.P., paraffinic. | | | 196/98 | | | | | Gloss-stable at 73° F. bloomed at about 93° F. |
| 39 | 5 | | 95 | | | | | | | | 235 | |
| 40 | 0 | | 100 | 180° F. M.P., residual paraffinic. | | | 39/11 | 57/0 | 0.6 | 9.7 | | Gloss-stable. All polymer blends were gloss-stable even after 24 hours. |
| 41 | 2 | F | 98 | | | | | | | | >300 | |
| 42 | 5 | | 95 | | 25.9 | 22.2 | | | | | >300 | |
| 43 | 10 | | 90 | | 66.3 | 59.9 | | | | | >300 | |
| 44 | 20 | | 80 | | 2,050 | 650 | CFT | CFT | 0.8 | 3.2 | 225–250 | |
| 45 | 30 | | 70 | | 8,250 | 5,410 | CFT | CFT | 0.9 | 1.1 | 225–250 | |
| 46 | 30 | | 70 | | | 3,476 | | | | | 200–225 | |
| 47 | 10 | E | 90 | 180° F. M.P., residual paraffinic. | | 55 | CFT | CFT | 0.3 | 5.9 | | All were gloss-stable. |
| 48 | 20 | | 80 | | | 662 | CFT | CFT | 1.2 | 2.0 | | |
| 49 | 30 | | 70 | | | 3,296 | CFT | CFT | 0.7 | 0.9 | | |
| 50 | 30 | | 70 | | | | CFT | CFT | | | | |
| 51 | 0 | F | 100 | 136.5° F. M.P., residual microcrystalline. | | | | | | | | All were gloss-stable. |
| 52 | 2 | | 98 | | | | | | | | 250–275 | |
| 53 | 5 | | 95 | | | 23.5 | | | | | 250–275 | |
| 54 | 10 | | 90 | | | 75.4 | | | | | 250–275 | |
| 55 | 20 | | 80 | | | 870 | | | | | 200–225 | |
| 56 | 30 | | 70 | | | 9,030 | | | | | 200–225 | |

[1] Refer to Table I.
[2] Coated on one side of paper except as otherwise indicated.
[3] Lowest temperature at which polymer and wax formed single phase.
[4] CFT denotes complete fiber tear (perfect seal).

The foregoing data (Table III) show quite graphically the difficulties which are encountered in blending copolymers into wax. For example, the blending of small amounts of copolymer (up to 15% by weight) tends to increase water vapor permeability. On the other hand, the use of large amounts of copolymer (above about 50% by weight) raises the viscosity of the blend beyond the useful viscosity range in most existing coating apparatus. Likewise, the addition of copolymer in small concentrations in some instances may also reduce sealing strength.

But even more importantly, the incorporation of copolymer into wax raises the problems of liquid phase compatibility and poor gloss characteristics.

Liquid phase incompatibility is a serious problem in that if the wax and copolymer are not compatible (miscible) at application conditions, the resultant separation of the mixture into separate liquid phases will result (1) in coatings having uneven thickness and properties, (2) in difficulties in coater operation, and (3) separation in hot tank storage. For this reason, one requirement of practical wax-polymer blends is that they be miscible at least down to the temperature at which they can be stored and applied to the substrate. In many instances this is about 190–210° F.

The data in Table III clearly show that no one type of wax component is suitable. Blends 1–11 show that, while low-melting-point paraffinic (distillate) wax results in blends of suitable compatibility (compatibility temperature below about 190° F.), such blends are wholly unsuitable because of their poor gloss stability characteristics. Though the higher-melting-point (141–143° F.) paraffinic (distillate) waxes when blended with the copolymer (Blends 12–31) are also sufficiently compatible, they likewise give coatings having poor gloss retention. However, the higher molecular weight paraffin wax is seen to require somewhat less polymer (15% versus 20%) to effect complete fiber tear on a sealing strength test.

The still higher (158–162° F.) melting-point paraffinic (distillate) waxes when blended with polymer yielded coatings of very good gloss stability at 73° F.; however the miscibility temperature with the copolymer, especially at concentrations of 10% or less, was too high (200–225° F.). Such waxes are additionally advantageous in that complete fiber tear is obtained with as little as 5% copolymer. The still higher molecular-weight residual waxes, paraffinic and/or microcrystalline, likewise have excellent blended seal strength and gloss stability but have extremely high miscibility temperatures at all concentrations.

It is therefore apparent that no one wax or wax type can be blended with ethylene-vinyl acetate copolymer to obtain a completely satisfactory coating material.

EXAMPLE II

A series of wax-copolymer blends were prepared which illustrate the effect of blending with different wax types and particularly the importance of the limitations in the compositions of the invention. The composition and properties of these blends are given in the following table:

wax for the lower melting material failed to improve gloss stability by any significant amount even though, as shown in Table III, the higher melting distillate wax alone had greater bloom stability than the lower melting wax. On the other hand, from blends 62, 65 and 66, it appears that, when the b/a ratio is within the afore-mentioned limits of 0.7:1 to 1.4:1, the addition of at least 5% by weight of higher (150° F.) melting-point wax has a beneficial effect on gloss stability, which effect is, quite surprisingly, not present when the relative proportions of residual and 150° F.-melting-point waxes are outside the above-mentioned limits.

In addition to the foregoing discussed limitations regarding ratio of distillate and residual waxes, it has also been found to be important to exclude very low-molecular-weight paraffinic waxes, i.e., those having a melting point below about 135° F. This important additional limitation is illustrated in the following example.

EXAMPLE III

Two wax-polymer blends were prepared, each containing 15% by weight copolymer. The base composition, selected because of its known satisfactory properties (Blend 59, see Table III), contained equal amounts of residual wax and 135° F.–150° F. distillate paraffinic wax and 12.1% by weight of 150° F. distillate paraffinic wax. In the other blend, half of the 135° F.–150° F. dis-

TABLE IV.—PROPERTIES OF MIXED WAX-POLYMER BLENDS

| Blend No. | Composition, percent wt. | | | | | Blend Properties | | | | | | | |
|---|---|---|---|---|---|---|---|---|---|---|---|---|---|
| | Polymer (Sample F in Table I) | 141–143° F. M.P., distillate paraffinic | 158–162° F. M.P., distillate paraffinic | 180° F. M.P., residual paraffinic | 136.5 °F. M.P., residual microcrystalline | Ratio, B/A | Brookfield viscosity (cp.) | | Sealing strength [1] (g/in) | | Gloss stability [2] at 110° F., 24 hrs | | Liquid Compatibility Temperature, °F. |
| | | | | | | | 210° F. | 240° F. | 75° F. | 85° F. | Initial | Final | |
| | | A | | B | | | | | | | | | |
| 57 | 5 | 40.7 | 13.6 | | 40.7 | 1.0 | 22 | 16 | | | 75 | 75 | <200 |
| 58 | 5 | 40.7 | 13.6 | 40.7 | | 1.0 | | | | | 74 | 70 | |
| 59 | 15 | 36.4 | 12.1 | ca. 20.5 | ca. 16 | 1.0 | 260 | 193 | CFT | CFT | 77 | 77 | 185 |
| 60 | 15 | 36.4 | 12.1 | ca. 20.5 | ca. 16 | 1.0 | | | | | 75 | 75 | |
| 61 | 15 | 25.7 | 8.7 | 25.7 | 24.9 | 2.0 | | | | | 85 | 75 | |
| 62 | 20 | 34.3 | 11.4 | | 34.3 | 1.0 | 884 | 525 | CFT | CFT | 75 | 60 | <190 |
| 63 | 20 | 34.3 | | 11.4 | 34.3 | 1.6 | | | | | 80 | 20 | |
| 64 | 20 | 22.9 | 11.4 | 11.4 | 34.3 | 2.0 | | | | | 83 | 35 | |
| 65 | 30 | 30 | 10 | | 30 | 1.0 | 6,850 | 3,780 | CFT | CFT | | | <190 |
| 66 | 30 | 35 | | | 35 | 1.0 | | | | | 78 | 46 | |

[1] CFT denotes complete fiber tear (perfect seal).   [2] Oven test with hand-dipped cardboard specimens.

Each of the wax copolymer blends was found to be stable with regard to blooming in that none bloomed even after extended storage at 73° F. This is particularly noteworthy in view of the fact that, as shown in Table III, Blends 12–31, the paraffinic waxes having a melting point below about 150° F. were particularly susceptible to blooming, whereas the present blends were bloom-stable with as high as 40.7% by weight of 141–143° F. melting-point paraffinic wax.

In addition, it is shown by Blends 57 and 58 that the two types of residual waxes, high-melting-point paraffinic and microcrystalline, may be used interchangeably without significant reduction in gloss stability of the blend. It was particularly interesting and quite unexpected to note that when the ratio of residual wax to paraffinic wax having a melting point below 150° F. (b/a) became too large, the gloss stability of the blend at the same copolymer levels was seriously degraded to an unacceptable level despite an initially higher gloss (reflectance). For this reason, the composition of the invention is limited to b/a ratios not exceeding about 1.41 and preferably ratios of about 1:1. Blends 63 and 64 also show that 150° F. melting-point paraffinic wax is not equivalent to lower melting-point paraffinic waxes in that substitution of that tillate paraffinic wax was substituted with 124–126° F. melting-point distillate paraffinic wax. The blend containing the low-melting wax was satisfactory in that it had no blooming tendency at 73° F., but bloomed severely at below 105° F. The base composition was found to be stable at that temperature. In addition, the low-melting wax-containing composition had a very low blocking temperature (102° F.) which further excluded it for use in coating materials which would be rolled or stacked.

Thus the blending of copolymer with the mixed wax blends of the invention results in wax-polymer mixtures having commercially desirable liquid (molten) compatibility (<200° F.) and which are stable to gloss deterioration, including "blooming" at temperature of 105 to 123° F. depending on the amount of polymer in the blend. Furthermore, each of the wax-copolymer compositions of the invention have excellent sealing strength and grease resistance.

EXAMPLE IV

That the mixed wax blends are similarly effective in copolymers of ethylene and alpha-olefins as well as other unsaturated esters is shown by the following tabulation of the properties of three further wax-copolymer blends.

TABLE V.—PROPERTIES OF WAX-COPOLYMER BLENDS

| Blend No. | Type of copolymer and concentration | Composition of Blend, percent wt. | | | Blend Properties | | |
|---|---|---|---|---|---|---|---|
| | | A 141–143° F. M.P., distillate paraffinic wax | 158–162° F. M.P., mixed paraffinic wax | B 172–182° F. M.P., mixed residual wax | Ratio, B/A | Gloss retention at 73° F. | Compatibility temperature (° F.) |
| 67 | 30% ethylene/ethyl acrylate copolymer (Sample L in Table II). | 30 | 10 | 30 | 1/1 | No bloom after 24 hours at 73° F. | <210 |
| 68 | 30% ethylene/methyl acrylate copolymer (Sample M in Table II). | 30 | 10 | 30 | 1/1 | ____do____ | <210 |
| 69 | 5% ethylene/propylene copolymer (Sample O in Table II). | 40.7 | 13.6 | 40.7 | 1/1 | ____do____ | <190 |

In addition, it has been found that coatings of outstanding properties can be produced by application of the following compositions to various fibrous substrates. In these coatings it will be noted that it is preferred to use high-melting residual paraffinic wax at higher polymer contents in place of microcrystalline or mixed microcrystalline and paraffinic residual wax.

TABLE VI.—COMPOSITION AND PROPERTIES OF PREFERRED WAX COPOLYMER BLENDS

| Blend No. | | 70 | 71 | | 72 | 73 |
|---|---|---|---|---|---|---|
| Composition, percent by weight: | | | | | | |
| Ethylene-vinyl acetate copolymer [1] | 5–17.5 | 5 | 15 | 17.5–35 | 20 | 30 |
| 141–143° F. M.P.,[5] paraffinic distillate wax | 35–45 | 40.7 | 36.4 | 25–35 | 34.3 | 30.0 |
| 158–162° F. M.P.,[6] paraffinic distillate wax | 10–15 | 13.6 | 12.1 | 10–15 | 11.4 | 10 |
| 172–180° F. M.P.,[5] mixed residual wax | 35–45 | 40.7 | 36.4 | | | |
| 183° F. M.P., paraffinic [5] residual wax | | | | 25–35 | 34–3 | 30.0 |
| Properties: | | | | | | |
| Bloom at 73° F | None | None | None | None | None | None |
| Compatibility temperature, ° F | <200 | <200 | <190 | <190 | <190 | <190 |
| Brookfield viscosity, cps.: | | | | | | |
| 210° F | | 22 | 260 | | 884 | 6850 |
| 240° F | | 16 | 193 | | 525 | 3780 |
| Blocking temperature, ° F.[2] | ≥110 | 120/123 | 111/115 | ≥100 | 104/106 | 102/105 |
| Sealing strength, g./in.[4]: | | | | | | |
| 75° F | CFT | CFT | CFT | CFT | CFT | CFT |
| 85° F | CFT | CFT | CFT | CFT | CFT | CFT |
| Grease resistance, days [3] | >30 | >30 | >30 | >30 | >30 | >30 |
| Crazing with Dry Ice | None | None | None | None | None | None |

[1] Type F, see Table I.
[2] With waxed sulfite paper.
[3] Days for peanut oil to penetrate 1 ml. thick film.
[4] Complete Fiber Tear.
[5] ASTM D-127.
[6] ASTM D-87.

We claim as our invention:

1. A polymer-containing wax coating composition consisting essentially of 5–50% by weight of a copolymer of ethylene and a $C_{3-5}$ comonomer selected from the group consisting of esters of terminally ethylenically unsaturated carboxylic acids and saturated aliphatic alcohols and esters of saturated monocarboxylic acids and terminally ethylenically unsaturated aliphatic alcohols said comonomer representing 17.4–30% by weight of the copolymer when the comonomer consists of esters of terminally ethylenically unsaturated carboxylic acids and saturated aliphatic alcohols and 18–33% by weight of the copolymer when the comonomer consists of esters of saturated monocarboxylic acids and terminally ethylenically unsaturated aliphatic alcohols, and 95–50% by weight of a mixture of petroleum wax consisting essentially of (a) a distillate paraffinic wax having a melting point of 135–150° F. and which contains no more than about 30% by weight non-normal paraffins and (b) a residual petroleum wax, the weight ratio of (a) and (b) each to the other being from 0.7:1 to 1.4:1, and (c) 5–15% by weight of distillate paraffinic wax having a melting point above 150° F. and which contains at least about 40% by weight of non-normal paraffins.

2. The composition of claim 1 in which the weight ratio of a and b each to the other is approximately 1:1.

3. The composition of claim 1 which contains 5–35% by weight of the copolymer.

4. A polymer-containing wax coating composition consisting essentially of 5–50% by weight of ethylene-vinyl acetate copolymer having an ethylene to vinyl acetate molar ratio from about 6.5:1 to 30:1 and 95–50% by weight of a mixture of petroleum wax consisting essentially of (a) a distillate paraffinic wax having a melting point of 135–150° F. and which contains no more than about 30% by weight non-normal paraffins and (b) a residual petroleum wax, the weight ratio of (a) and (b) each to the other being from 0.7:1 to 1.4:1, and (c) 5–15% by weight of distillate paraffinic wax having a melting point above 150° F.

5. A polymer-containing wax coating composition according to claim 5 consisting essentially of 5–17.5% by weight of ethylene-vinyl acetate copolymer having an ethylene to vinyl acetate molar ratio from about 8:1 to 14:1 and 95–82.5% by weight of a mixture of petroleum wax basis total composition consisting essentially of (a) 35–40% by weight of a distillate paraffinic wax having an ASTM D-87 melting point of 135–150° F. and which contains no more than about 30% by weight non-normal paraffins and (b) 35–45% by weight of a residual petroleum wax containing both microcrystalline and high-melting-point paraffinic wax, the residual wax having an ASTM D-127 melting point of at least 160° F., and (c) 10–15% by weight of a distillate paraffinic wax having an ASTM D-87 melting point above 150° F.

6. A polymer-containing wax coating composition according to claim 5 consisting essentially of 5–17.5% by weight of ethylene-vinyl acetate copolymer having an ethylene to vinyl acetate molar ratio from about 8:1 to 14:1 and 95–82.5% by weight of a mixture of petroleum wax basis total composition consisting essentially of (a) 35–45% by weight of a distillate paraffinic wax having an ASTM D-87 melting point of 141–143° F. and which contains no more than about 30% by weight non-normal paraffins and (b) 35–45% by weight of a residual petroleum wax containing both microcrystalline and high-melting-point paraffinic wax, the residual wax having an ASTM D–127 melting point of 172–180° F., and (c) 10–15% by weight of a distillate paraffinic wax having an ASTM D–87 melting point of 158–162° F.

7. A polymer-containing wax coating composition according to claim 5 consisting essentially of 17.5–35% by weight of ethylene-vinyl acetate copolymer having an ethylene to vinyl acetate molar ratio from about 8:1 to 14:1 and 82.5–65% by weight of a mixture of petroleum wax basis total composition consisting essentially of (a) 25–35% by weight of a distillate paraffinic wax having an ASTM D–87 melting point of 135–150° F. and which contains no more than about 30% by weight non-normal paraffins and (b) 25–35% by weight of a high-melting-point residual paraffinic wax containing both microcrystalline and high-melting-point paraffinic wax, the high-melting-point residual paraffinic wax having an ASTM D–127 melting point of at least 160° F., and (c) 10–15% by weight of a distillate paraffinic wax having an ASTM D–87 melting point above 150° F.

8. A polymer-containing wax coating composition according to claim 5 consisting essentially of 5–17.5% by weight of ethylene-vinyl acetate copolymer having an ethylene to vinyl acetate molar ratio from about 8:1 to 14:1 and 95–82.5% by weight of a mixture of petroleum wax basis total composition consisting essentially of (a) 35–45% by weight of a distillate paraffinic wax having an ASTM D–87 melting point of 141–143° F. and which contains no more than about 30% by weight non-normal paraffins and (b) 35–45% by weight of a residual petroleum wax containing both microcrystalline and high-melting-point paraffinic wax, the residual wax having an ASTM D–127 melting point of at least 180° F., and (c) 10–15% by weight of a distillate paraffinic wax having an ASTM D–87 melting point of 158–162° F.

9. A polymer-containing wax coating composition according to claim 1 in which the comonomer is an ester of acrylic acid and a saturated aliphatic alcohol.

10. The composition of claim 9 in which the comonomer is ethyl acrylate.

11. The composition of claim 9 in which the comonomer is methyl acrylate.

References Cited
UNITED STATES PATENTS

| | | | |
|---|---|---|---|
| 2,728,735 | 12/1955 | Anderson | 260—28.5 |
| 3,060,045 | 10/1962 | Malakoff et al. | 106—270 |
| 3,175,986 | 3/1965 | Apikos et al. | 260—28.5 |
| 3,192,062 | 6/1965 | Arabian et al. | 260—28.5 |
| 3,210,305 | 10/1965 | Coenen et al. | 260—28.5 |

MORRIS LIEBMAN, *Primary Examiner.*

B. A. AMERNICK, *Assistant Examiner.*